US012646199B2

(12) United States Patent
Bugaiov et al.

(10) Patent No.: US 12,646,199 B2
(45) Date of Patent: Jun. 2, 2026

(54) METHOD AND DEVICE FOR ESTIMATING POSE OF USER

(71) Applicant: Samsung Electronics Co., Ltd., Suwon-si (KR)

(72) Inventors: Andrii Bugaiov, Kyiv (UA); Serhii Koliiev, Kyiv (UA); Yuriy Sikula, Kyiv (UA); Yuliia Bakhmat, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 18/363,208

(22) Filed: Aug. 1, 2023

(65) Prior Publication Data

US 2024/0202958 A1 Jun. 20, 2024

(30) Foreign Application Priority Data

Dec. 16, 2022 (KR) ......................... 10-2022-0176710

(51) Int. Cl.
| | |
|---|---|
| *G06T 7/70* | (2017.01) |
| *G02B 27/01* | (2006.01) |
| *G06F 3/01* | (2006.01) |

(52) U.S. Cl.
CPC ................ *G06T 7/70* (2017.01); *G02B 27/01* (2013.01); *G06F 3/012* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 11,194,386 B1 | 12/2021 | Zhao | |
| 11,210,993 B2 * | 12/2021 | Kuwahara | ............... G06F 3/147 |
| 12,169,276 B2 * | 12/2024 | Fortin-Deschenes | ....................... G02B 27/0093 |
| 2014/0135960 A1 | 5/2014 | Choi | |
| 2017/0188980 A1 | 7/2017 | Ash | |
| 2019/0340435 A1 * | 11/2019 | Rabinovich | ............. G06F 3/011 |
| 2020/0175712 A1 | 6/2020 | Guignard | |
| 2021/0157396 A1 * | 5/2021 | Huang | ............... G02B 27/0172 |
| 2021/0298644 A1 | 9/2021 | Chen et al. | |
| 2022/0083768 A1 * | 3/2022 | Johnson | ................. G06N 20/00 |
| 2022/0319041 A1 * | 10/2022 | Jiang | .................... G02B 27/017 |
| 2023/0004218 A1 * | 1/2023 | Zhang | ..................... G06F 3/013 |

(Continued)

FOREIGN PATENT DOCUMENTS

| | | |
|---|---|---|
| CN | 106843456 A | 6/2017 |
| KR | 10-2405416 B1 | 6/2022 |

*Primary Examiner* — Miya J Cato
(74) *Attorney, Agent, or Firm* — Jefferson IP Law, LLP

(57) ABSTRACT

A method for estimating a pose of a user by a head-mounted display (HMD) device is provided. The method includes obtaining at least two images from at least two cameras of the HMD device, each of the at least two obtained images including a view of at least a portion of a body of the user wearing the HMD device, estimating a pose of the body of the user based on the view of the at least portion of the body of the user included in each of the at least two obtained images, estimating a pose of a head of the user based on the at least two obtained images, and estimating the pose of the user based on the estimated pose of the body of the user and the estimated pose of the head of the user.

20 Claims, 7 Drawing Sheets

(56)                    References Cited

U.S. PATENT DOCUMENTS

2023/0282031 A1*   9/2023  Ali Akbarian ....... G06V 10/766
                                                   382/103
2023/0400914 A1*  12/2023  Lefaudeux ........... G06V 40/103

* cited by examiner

100

130

120

110

140

First camera overall view

6DoF tracking system

100

110

Second camera overall view

120

First camera
user body view

Second camera
user body view

METHOD AND DEVICE FOR ESTIMATING POSE OF USER

CROSS-REFERENCE TO RELATED APPLICATION(S)

This application is based on and claims priority under 35 U.S.C. § 119(a) of a Korean patent application number 10-2022-0176710, filed on Dec. 16, 2022, in the Korean Intellectual Property Office, the disclosure of which is incorporated by reference herein in its entirety.

BACKGROUND

1. Field

The disclosure relates to a method and device for estimating a user's pose. More particularly, the disclosure relates to estimating a pose of a user wearing a head-mounted display (HMD) device.

2. Description of Related Art

The technology field related to virtual reality (VR) and augmented reality (AR) is developing rapidly. To provide VR or AR to a user, an HMD device may be used. An HMD device may be mounted on a user's head and may provide VR or AR-related information via a display panel that is positioned adjacent to the user's eyes. Various types of HMD devices exist, and HMD devices may include glasses-type display devices, such as extended reality (XR) glasses, which includes VR glasses, AR glasses, and mixed reality (MR) glasses.

In order to provide more effective and accurate user interaction within a VR or AR environment, it is necessary to accurately detect the user's pose. Various conventional HMD devices do not provide inherent functions for detecting the user's pose. Therefore, one or more sensors that are positioned independently of the HMD device may be used to detect the user's pose. Some existing HMD devices may detect the pose or motion of a part of the user's body, such as the user's hand, through a camera disposed toward the front of the HMD device, but may not detect the user's overall pose. Devices such as motion capture suits separate from the HMD device may be used to detect the user's pose, but these devices may cause problems such as low convenience and high cost.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for estimating a user's pose using an HMD device alone, without the assistance of a sensing device separate from the HMD device, and an HMD device therefor.

Additional aspects will be set forth in part in the description which follows and, in part, will be apparent from the description, or may be learned by practice of the presented embodiments.

In accordance with an aspect of the disclosure, a method for estimating a pose of a user by a head-mounted display (HMD) device is provided. The method includes obtaining at least two images from at least two cameras of the HMD device. Each of the at least two obtained images includes a view of at least a portion of a body of the user wearing the HMD device. The method includes estimating a pose of the body of the user based on the view of the at least portion of the body of the user included in each of the at least two obtained images. The method includes estimating a pose of a head of the user based on the at least two obtained images. The method includes estimating the pose of the user based on the estimated pose of the body of the user and the estimated pose of the head of the user.

The pose of the body of the user may be estimated based on inverse kinematics customized to operate in a view from above.

The estimated pose of the head of the user may be a 6 degrees of freedom (DoF) pose.

The estimating of the pose of the user includes estimating at least one of a tilt and a rotation of the head of the user with respect to the estimated pose of the body of the user.

The at least two cameras includes a first camera disposed at a lower end of a first side of the HMD device, and a second camera disposed at a lower end of a second side of the HMD device opposite the first side.

The pose of the body of the user may be estimated further based on an output from an inertial sensor of the HMD device.

Each of the at least two cameras may be a fisheye camera.

The HMD device may be one among augmented reality (AR) glasses, virtual reality (VR) glasses, and mixed reality (MR) glasses.

In accordance with another aspect of the disclosure, an HMD device is provided. The HMD device includes at least two cameras and a controller. The controller may be configured to obtain at least two images from the at least two cameras. Each of the at least two obtained images includes a view of at least a portion of a body of a user wearing the HMD device. The controller may be configured to estimate a pose of the body of the user based on the view of the at least portion of the body of the user included in each of the at least two obtained images. The controller may be configured to estimate a pose of a head of the user based on the at least two obtained images. The controller may be configured to estimate a pose of the user based on the estimated pose of the body of the user and the estimated pose of the head of the user.

In accordance with another aspect of the disclosure, a non-transitory computer-readable medium storing instructions is provided. The instructions, when executed by a controller of an HMD device, may cause the HMD device to perform operations. The operations includes obtaining at least two images from at least two cameras of the HMD device. Each of the at least two obtained images includes a view of at least a portion of a body of a user wearing the HMD device. The operations includes estimating a pose of the body of the user based on the view of the at least portion of the body of the user included in each of the at least two obtained images. The operations includes estimating a pose of a head of the user based on the at least two obtained images. The operations includes estimating a pose of the user based on the estimated pose of the body of the user and the estimated pose of the head of the user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
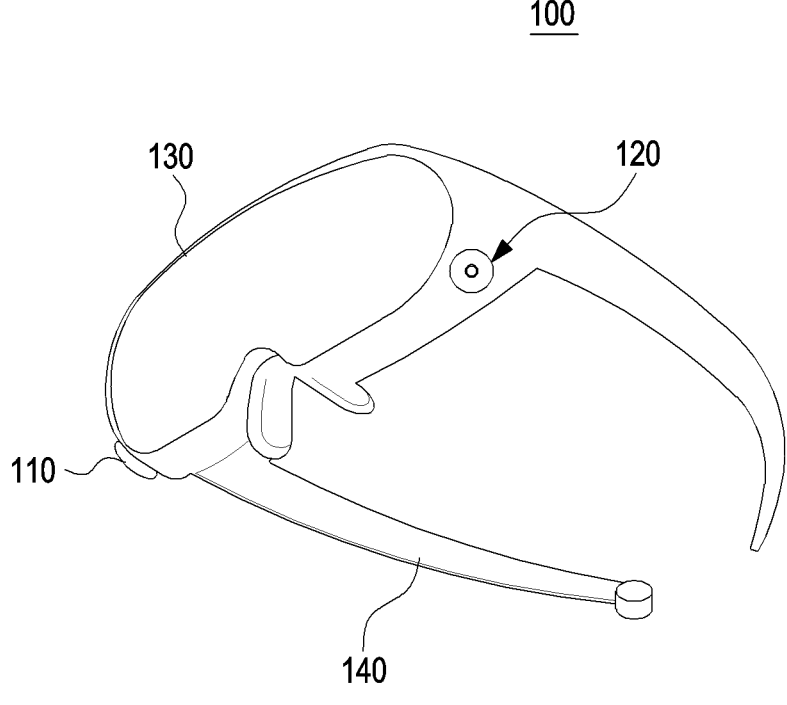
FIG. 1 illustrates an HMD device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

As used herein, the terms including an ordinal number, such as "a first" and "a second", may be used to described various elements, but the corresponding elements should not be limited by such terms. These terms are used merely to distinguish between one element and any other element. For example, a first element may be termed a second element, and similarly, a second element may be termed a first element without departing from the scope of the disclosure. Furthermore, the term "and/or" includes any one or combinations of a plurality of relevant items enumerated.

The terms as used in an embodiment of the disclosure are merely used to describe specific embodiments, and are not intended to limit the disclosure. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

As used in embodiments of the disclosure, unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in embodiments of the disclosure.

FIG. 1 illustrates an HMD device according to an embodiment of the disclosure. An HMD device may be a glasses-type display device (e.g., XR glasses, which is one among AR glasses, VR glasses, and MR glasses) as illustrated in FIG. 1, but is not necessarily limited thereto.

Referring to FIG. 1, the HMD device 100 may include a display 130 disposed at the front surface thereof and positioned adjacent to the front of a user's eyes when worn by the user. The display 130 may include a transparent display panel, a translucent display panel, or an opaque display, and may include a display panel obtained by a combination of two or more of these display panels. The display 130 may include at least one of a liquid crystal display (LCD), a digital mirror device (DMD), a liquid crystal on silicon (LCoS), an organic light-emitting diode (OLED), or a micro light-emitting diode (micro LED). The HMD device 100 may provide a visual representation related to VR or AR to a user via the display 130.

Although not illustrated, the HMD device 100 may include an optical waveguide (e.g., a wave guide). An image output from the display 130 and incident on one end of the optical waveguide may propagate in the optical waveguide and be provided to the user. According to another embodiment of the disclosure, the optical waveguide may include at least one of at least one diffractive element (e.g., a diffractive optical element (DOE), a holographic optical element (HOE)) or at least one reflective element (e.g., a reflective mirror). The optical waveguide may use the at least one diffractive element or the at least one reflective element to guide the image output from the display 130 to the user's eyes.

The HMD device 100 may include wearing means 140 which is to be worn on the user's head. The HMD device 100 of the glasses type, as illustrated in FIG. 1, may include the wearing means 140 in a form similar to temples of glasses. The wearing means 140 may be, but is not necessarily limited to, band-type wearing means. An HMD device, which is to be worn on the head, may include a wearing means in the form of a chin strap, or may not include a separate wearing means.

The HMD device 100 may include at least two cameras 110 and 120 including a first camera 110 and a second camera 120. The cameras 110 and 120 may be cameras having a wide field of view. For example, the cameras 110 and 120 may be fisheye cameras. The cameras 110 and 120 may be disposed at lower ends of the sides of the HMD device 100, respectively. For example, the first camera 110 may be disposed at a lower end of one side of the HMD device 100, and the second camera 120 may be disposed at a lower end of an opposite side to the one side. The field of view of each of the cameras 110 and 120 may include the body of a user wearing the HMD device 100. The HMD device 100 may estimate the user's pose by using images captured by the cameras. This will be described in more detail with reference to FIG. 2.

The HMD device 100 may include at least one additional camera other than the cameras 110 and 120. For example, the HMD device 100 may further include at least one among: a camera for photographing or recognizing the trajectory of the user's eye (e.g., pupil or iris) or gaze, a camera for photographing the front of the HMD device 100, and a camera for detecting and tracking the user's hand and recognizing gestures (e.g., hand gestures).

Figure 2:
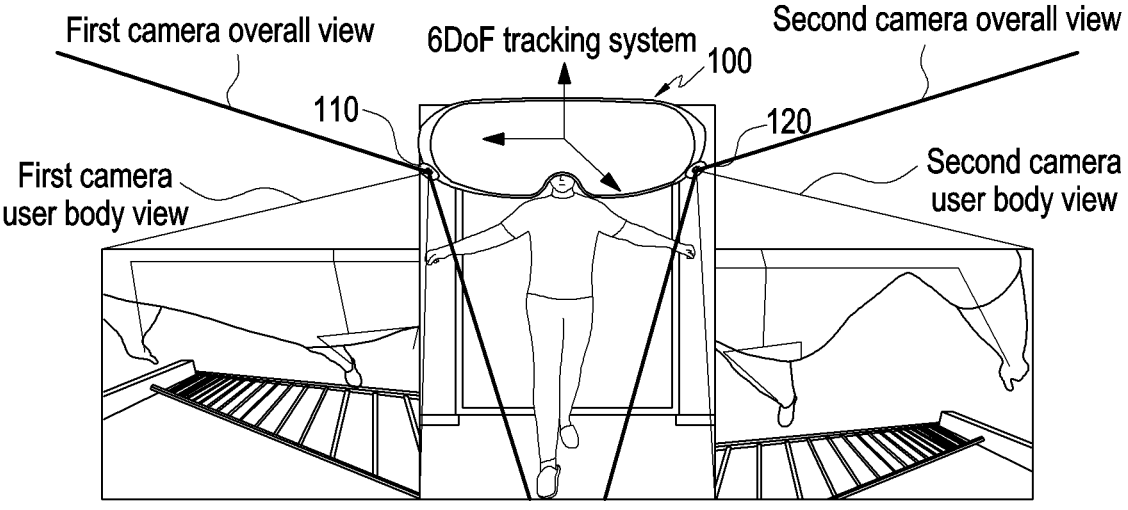
FIG. 2 illustrates images captured by cameras of an HMD device according to an embodiment of the disclosure.

FIG. 2 illustrates images captured by cameras of an HMD device according to an embodiment of the disclosure.

Referring to FIG. 2, the overall view of each of the cameras 110 and 120 may include a view of the body of a user of the HMD device 100. For example, a right-biased view of the user's body may be obtained through the first camera 110, and a left-biased view of the user's body may be obtained through the second camera 120. Thus, both the first camera 110 and the second camera 120 may be used to obtain images of both the left and right sides of the user's body.

The HMD device 100 may estimate the pose of the user's body based on a view of the user's body from the HMD device 100. The body may refer to the torso, arms, and legs of the user, excluding the head of the user. The HMD device 100 may estimate the pose of the user's body by applying inverse kinematics to the view of the user's body obtained from each of the cameras 110 and 120. The inverse kinematics may be customized to operate on a view of the user's body viewed from above. The HMD device 100 may estimate the skeleton of the user's body from the view of the user's body by using inverse kinematics, and may estimate the pose of the user's body from the estimated skeleton.

The overall view obtained from each of the cameras 110 and 120 may include a view of the user's body as well as a view of the user's surroundings. The HMD device 100 may estimate the pose of the user's head from the view of the user's surroundings. The HMD device 100 may estimate the pose of the user's head by using a six degrees of freedom (6DoF) tracking system with respect to the view of the user's surroundings. That is, the HMD device 100 may estimate the position and direction of the user's head, for example, in the 6DoF system. The estimated pose of the user's head may include tilt and rotation of the user's head with respect to the user's body (i.e., the torso).

That is, the HMD device 100 may estimate both the pose of the user's body and the pose of the user's head from the images obtained from the cameras 110 and 120. The HMD device 100 may estimate the user's pose by combining the estimated pose of the user's body and the estimated pose of the user's head.

According to another embodiment, when the view of at least one of the cameras 110 and 120 includes a view of a person other than the user, the HMD device 100 may use inverse kinematics to estimate the other person's pose from the view of the other person.

Figure 3:
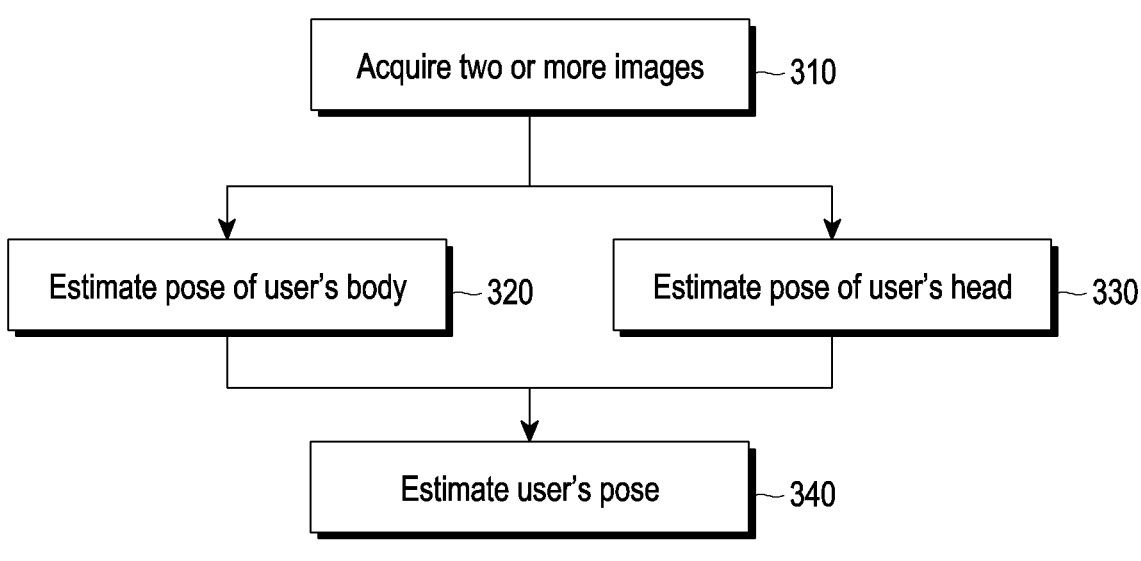
FIG. 3 illustrates a flowchart of a method for estimating a user's pose according to an embodiment of the disclosure.

FIG. 3 illustrates a flowchart of a method for estimating a user's pose according to an embodiment of the disclosure. The method described illustrated in FIG. 3 may be executed by the HMD device 100.

Referring to FIG. 3, the method may include an operation 310 of obtaining two or more images by using the cameras 110 and 120. The cameras 110 and 120 may be disposed at lower ends of both sides of the HMD device 100, respectively. The two or more images obtained from the cameras 110 and 120 may include a view of the user's body and a view of the user's surroundings.

The method may include an operation 320 of estimating the pose of the user's body. The HMD device 100 may estimate the pose of the user's body based on the view of the user's body included in the two or more images obtained from the cameras. The HMD device 100 may estimate the pose of the user's body by applying inverse kinematics to the view of the user's body included in the two or more obtained images. Here, the estimated pose of the user's body does not include the pose of the user's head.

The method may include an operation 330 of estimating the pose of the user's head. The HMD device 100 may estimate the pose of the user's head based on the view of the user's surroundings included in the two or more obtained images. The HMD device 100 may estimate the pose of the user's head by applying a 6DoF tracking system to the view of the user's surroundings. The HMD device 100 may estimate the pose of the user's head additionally based on information obtained from at least one sensor (e.g., an inertial sensor) included in the HMD device 100 in addition to the view of the user's surroundings. The estimated pose of the user's head may include a position of the user's head in space (e.g., space in the 6DoF system).

The method may include an operation 340 of estimating the user's pose. The user's pose may be determined based on the estimated pose of the user's body and the estimated pose of the user's head. The HMD device 100 may estimate the user's pose by combining the estimated pose of the user's body and the estimated pose of the user's head. The estimated user pose may be an overall pose of the user's body, including the user's head. To estimate the user's pose, the HMD device 100 may estimate at least one of a tilt and a rotation of the user's head with respect to the estimated pose of the user's body. In another embodiment, the tilt and rotation of the user's head with respect to the user's body may be included in the estimated pose of the head in operation 330.

Additionally, the HMD device 100 may determine, from the estimated user's pose, that the user is in one of multiple predefined poses. The multiple predefined poses may include, for example, but are not limited to, a seated pose, a standing pose, a lying pose, and a chin-resting pose.

As described above, the HMD device 100 of the disclosure may estimate and determine the pose of a user of the HMD device 100, including the pose of the user's head, by using images obtained through the cameras 110 and 120 included in the HMD device 100, without the need for a separate device other than the HMD device 100.

Figure 4:
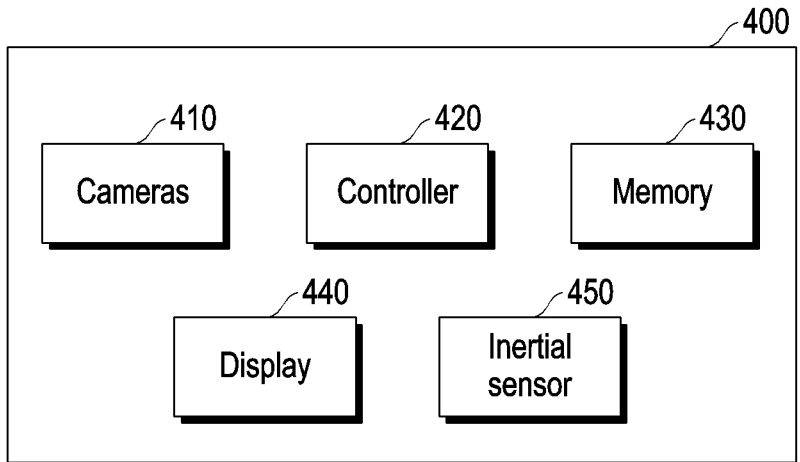
FIG. 4 is a block diagram of an HMD device according to an embodiment of the disclosure.

FIG. 4 is a block diagram of an HMD device according to an embodiment of the disclosure.

Referring to FIG. 4, an HMD device 400 may include cameras 410 and a controller 420. The HMD device 400 may be substantially the same as the HMD device 100 described above. The HMD device 400 may be, for example, but not limited to, XR glasses.

The cameras 410 may include cameras (e.g., the cameras 110 and 120 of the HMD device 100) disposed at lower ends of both sides of the HMD device 400, respectively. The cameras 410 may be cameras with a wide field of view, such as fisheye cameras. Images captured by the cameras may include a view of the user's body and a view of the user's surroundings. The images captured by the cameras may be used to estimate the user's pose. According to another embodiment, the cameras 410 may further include at least one camera (e.g., a camera for photographing the front of the HMD device 400) other than the cameras disposed at the lower ends of both sides of the HMD device 400, respectively.

The controller 420 may be implemented as one or more processors. The controller 420 may be connected to other elements of the HMD device 400, and may control operations of the other elements. The controller 420 may control overall operations of the HMD device 400. Operations executed by the HMD device 400 may be interpreted as being executed substantially by the controller 420. For example, the operation of the HMD device 400 obtaining images through the cameras 410 may be interpreted as an operation in which the controller 420 controls the cameras 410 to obtain the images. The operations of the HMD device 100 described above with reference to FIGS. 1 to 3 may be interpreted as being executed by the controller 420. The controller 420 may estimate the user's pose from the images obtained from the cameras 410, using the method described with reference to FIG. 3.

The HMD device 400 may further include a memory 430. The memory 430 may store transient and non-transient data required for operation of the controller 420. The memory 430 may store commands (or program codes) for operating the controller 420. The commands, when executed by the controller 420, may cause the controller 420 (or the HMD device 400) to perform the operations of the HMD device 100 described above with reference to FIGS. 1 to 3. The memory 430 or a part of the memory 430 that stores the commands may also be referred to as a non-transitory computer-readable storage medium.

The HMD device 400 may further include a display 440. The display 440 may refer to a display panel. The display 440 may be a transparent display, a translucent display, an opaque display, or a combination thereof. When the HMD device 400 is worn by a user, the display 440 may be positioned adjacent to the front of the user's eyes. The display 440 may provide the user with visual information related to AR or VR.

The HMD device 400 may further include an inertial sensor 450. The inertial sensor 450 may include at least one among a gyroscope, an accelerometer, and a geomagnetic sensor. The inertial sensor 450 may measure angular velocity, acceleration, and tilt with respect to the geomagnetic field. Data or information obtained by the inertial sensors 450 may be used, together with the view of the user's surroundings included in the images obtained through the cameras 410, to estimate the pose of the user's head.

In addition to the inertial sensor 450, the HMD device 400 may further include at least one of sensors, such as a vertical cavity surface emitting laser (VCSEL), an infrared sensor, and a photodiode. The HMD device 400 may further include a depth sensor. The depth sensor may be configured to transmit a signal and receive a signal reflected from a subject, and may be used, like time of flight (TOF), to measure a distance from an object.

Figure 5:
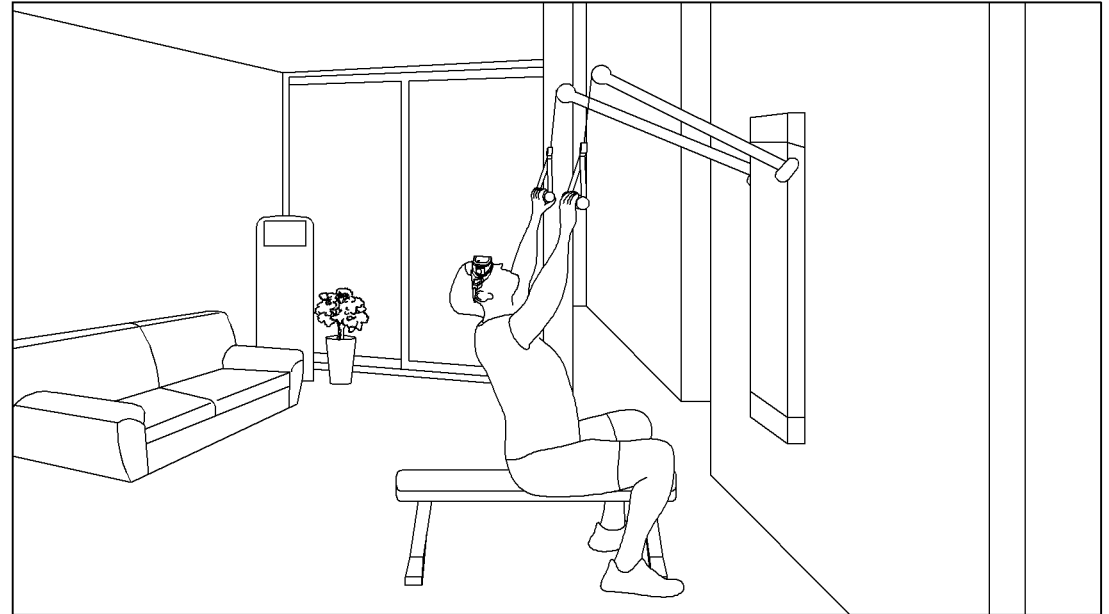
FIG. 5 illustrates an example of use of an HMD device according to an embodiment of the disclosure.

FIG. 5 illustrates an example of use of an HMD device according to an embodiment of the disclosure.

Referring to FIG. 5, the HMD devices 100 and 400 of the disclosure may be used for smart training. The HMD devices 100 and 400 may estimate a user's pose by using cameras embedded in the HMD devices 100 and 400 without the need for separate equipment. Thus, the HMD devices 100 and 400 may calculate the user's position, and the state of exercise (e.g., the number of repetitions of the exercise and the duration of the exercise) to provide feedback regarding the quality of the user's exercise. When using the HMD devices 100 and 400, less space may be required to implement smart training than other display devices (e.g., televisions or smartphones) for providing visual feedback to the user. In addition, smart training using the HMD device 100 or 400 may accurately estimate the user's physical limitations to optimize insurance programs for the user.

Figure 6:
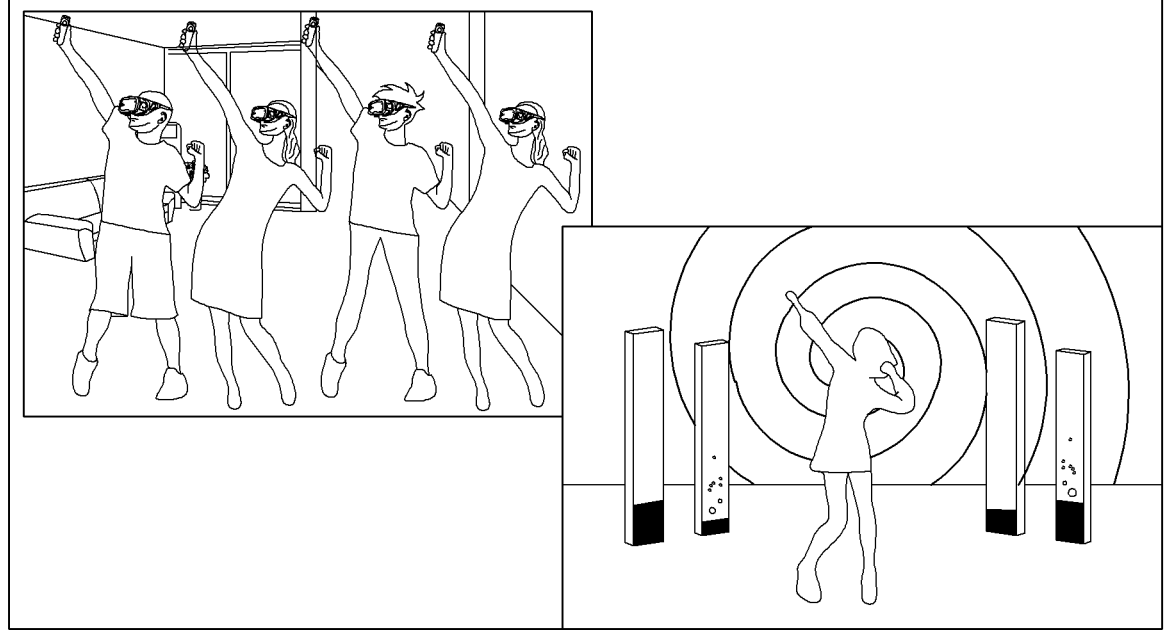
FIG. 6 illustrates an example of use of an HMD device according to an embodiment of the disclosure.

FIG. 6 illustrates an example of use of an HMD device according to an embodiment of the disclosure.

Referring to FIG. 6, the HMD devices 100 and 400 of the disclosure may be used for a dancing activity in a virtual space. The HMD devices 100 and 400 each may present a virtual dancing trainer to a user, and track the user's dancing movements by using cameras embedded in the HMD devices 100 and 400 to provide feedback on the accuracy of the user's execution. Multiple users, each wearing the HMD device 100 or 400, may simultaneously perform the dancing activity, and interactions between the users in virtual reality may be generated and displayed on the HMD device 100 or 400. Thus, a virtual metaverse environment for the dancing play of the multiple users may be produced.

Figure 7:
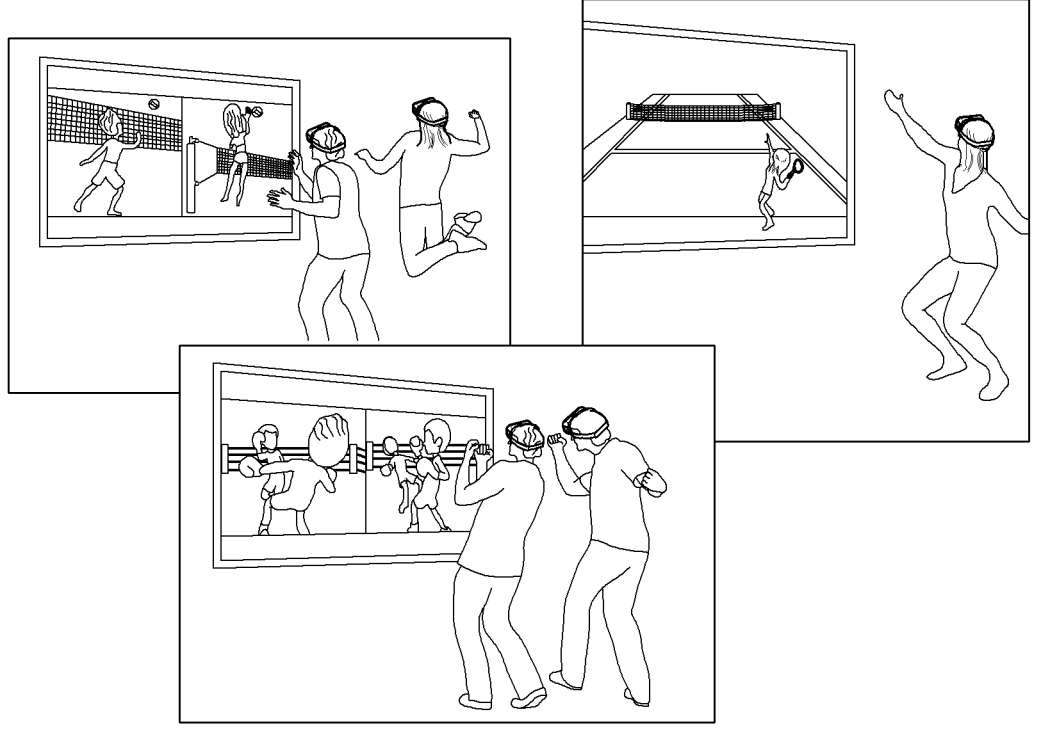
FIG. 7 illustrates an example of use of an HMD device according to an embodiment of the disclosure.

FIG. 7 illustrates an example of use of an HMD device according to an embodiment of the disclosure.

Referring to FIG. 7, the HMD devices 100 and 400 may be used for games (e.g., sports games) in virtual reality. A user's pose and motion estimated by the HMD device 100 or 400 may be played in virtual reality. In addition, virtual interactions between users wearing the HMD device 100 or 400 may be produced and displayed. Thus, a virtual metaverse environment for game play between multiple users may be produced.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a head-mounted display (HMD) device for estimating a pose of a user wearing the HMD device, the method comprising:

obtaining at least two images from at least two cameras of the HMD device, the obtained at least two images including a view of at least a portion of a body of the user wearing the HMD device;

estimating a pose of the body of the user based on the view of the at least the portion of the body of the user included in the obtained at least two images;

estimating a position of a head of the user in a space, a tilt and a rotation of the head of the user with respect to the estimated pose of the body of the user based on the obtained at least two images; and estimating the pose of the user based on the estimated pose of the body of the user, the estimated position of the head of the user in the space, and the estimated tilt and the estimated rotation of the head of the user with respect to the estimated pose of the body of the user, wherein the estimated position of the head of the user is based on information received via an inertial sensor, and wherein the inertial sensor measures angular velocity, acceleration, and tilt with respect to the user's surroundings.

2. The method of claim 1, wherein the pose of the body of the user is estimated based on inverse kinematics customized to operate in a view from above.

3. The method of claim 1, wherein the tilt and the rotation of the head of the user is estimated by using a 6 degrees of freedom (DoF) tracking system.

4. The method of claim 1, wherein the at least two cameras comprise:

a first camera disposed at a lower end of a first side of the HMD device; and a second camera disposed at a lower end of a second side of the HMD device opposite the first side.

5. The method of claim 1, wherein the pose of the body of the user is estimated further based on an output from an inertial sensor of the HMD device.

6. The method of claim 1, wherein each of the at least two cameras is a fisheye camera.

7. The method of claim 1, wherein the HMD device is one among augmented reality (AR) glasses, virtual reality (VR) glasses, or mixed reality (MR) glasses.

8. The method of claim 1, wherein the at least two cameras capture the user's movements during natural movements of the user, and wherein the natural movements of the user includes dancing and exercise.

9. The method of claim 1, wherein the at least two cameras capture interactions between the HMD device and an external HMD device.

10. The method of claim 1, further comprising:

estimating physical limitations of the user based on the estimated tilt and the estimated rotation of the head of the user.

11. A head-mounted display (HMD) device comprising:

at least two cameras;

memory, comprising one or more storage media, storing instructions; and one or more processors communicatively coupled to the at least two cameras and the memory, wherein the instructions, when executed by the one or more processors individually or collectively, cause the HMD device to:

obtain at least two images from the at least two cameras, the obtained at least two images including a view of at least a portion of a body of a user wearing the HMD device, estimate a pose of the body of the user based on the view of the at least the portion of the body of the user included in the obtained at least two images, estimate a position of a head of the user in a space, a tilt and a rotation of the head of the user with respect to the estimated pose of the body of the user based on the obtained at least two images, and estimate a pose of the user based on the estimated pose of the body of the user, the estimated position of the head of the user in the space, and the estimated tilt and the estimated rotation of the head of the user with respect to the estimated pose of the body of the user, wherein the estimated position of the head of the user is based on information received via an inertial sensor, and wherein the inertial sensor measures angular velocity, acceleration, and tilt with respect to the user's surroundings.

12. The HMD device of claim 11, wherein the pose of the body of the user is estimated based on inverse kinematics customized to operate in a view from above.

13. The HMD device of claim 11, wherein the tilt and the rotation of the head of the user is estimated by using a 6 degrees of freedom (DoF) tracking system.

14. The HMD device of claim 11, wherein the at least two cameras comprise:

a first camera disposed at a lower end of a first side of the HMD device; and a second camera disposed at a lower end of a second side of the HMD device opposite the first side.

15. The HMD device of claim 11, further comprising:

an inertial sensor, wherein the pose of the body of the user is estimated further based on an output from the inertial sensor of the HMD device.

16. The HMD device of claim 11, wherein each of the at least two cameras is a fisheye camera.

17. The HMD device of claim 11, wherein the HMD device is one among augmented reality (AR) glasses, virtual reality (VR) glasses, or mixed reality (MR) glasses.

18. A One or more non-transitory computer-readable storage media storing one or more computer programs including computer-executable instructions which, when executed by one or more processors of a head-mounted display (HMD) device, cause the HMD device to perform operations, the operations comprising:

obtaining at least two images from at least two cameras of the HMD device, the obtained at least two images including a view of at least a portion of a body of a user wearing the HMD device;

estimating a pose of the body of the user based on the view of the at least the portion of the body of the user included in the obtained at least two images;

estimating a position of a head of the user in a space, a tilt and a rotation of the head of the user with respect to the estimated pose of the body of the user based on the obtained at least two images; and estimating the pose of the user based on the estimated pose of the body of the user, the estimated position of the head of the user in the space, and the estimated tilt and the estimated rotation of the head of the user with respect to the estimated pose of the body of the user, wherein the estimated position of the head of the user is based on information received via an inertial sensor, and wherein the inertial sensor measures angular velocity, acceleration, and tilt with respect to the user's surroundings.

19. The one or more non-transitory computer-readable storage media of claim 18, wherein the pose of the body of the user is estimated based on inverse kinematics customized to operate in a view from above.

20. The one or more non-transitory computer-readable storage media of claim 18, wherein the pose of the body of the user is estimated further based on an output from an inertial sensor of the HMD device.

* * * * *